(12) United States Patent
Heeg et al.

(10) Patent No.: US 10,207,603 B2
(45) Date of Patent: Feb. 19, 2019

(54) DRIVE SYSTEM FOR A TILT ADJUSTMENT, VEHICLE SEAT, METHOD FOR OPERATING A DRIVE SYSTEM

(71) Applicant: Adient Luxembourg Holding S.à.r.l., Luxembourg (LU)

(72) Inventors: Norbert Heeg, Dahn (DE); Eckhard Kirch, Bann (DE)

(73) Assignee: Adient Luxembourg Holding S.à.r.l., Luxembourg (LU)

( * ) Notice: Subject to any disclaimer, the term of this patent is extended or adjusted under 35 U.S.C. 154(b) by 46 days.

(21) Appl. No.: 15/526,856

(22) PCT Filed: Nov. 10, 2015

(86) PCT No.: PCT/EP2015/076196
§ 371 (c)(1),
(2) Date: May 15, 2017

(87) PCT Pub. No.: WO2016/075133
PCT Pub. Date: May 19, 2016

(65) Prior Publication Data
US 2017/0334320 A1 Nov. 23, 2017

(30) Foreign Application Priority Data

Nov. 14, 2014 (DE) .......................... 10 2014 223 260
Jan. 20, 2015 (DE) .......................... 10 2015 200 816

(51) Int. Cl.
*B60N 2/22* (2006.01)
*B60N 2/02* (2006.01)
(Continued)

(52) U.S. Cl.
CPC .......... *B60N 2/2213* (2013.01); *B60N 2/0232* (2013.01); *B60N 2/206* (2013.01); *B60N 2/235* (2013.01); *B60N 2002/0236* (2013.01)

(58) Field of Classification Search
CPC .... B60N 2/2213; B60N 2/0232; B60N 2/206; B60N 2/235; B60N 2002/0236
See application file for complete search history.

(56) References Cited

U.S. PATENT DOCUMENTS

2009/0096270 A1 4/2009 Halbig et al.
2011/0095584 A1 4/2011 Tomida et al.

FOREIGN PATENT DOCUMENTS

DE          103 56 614 A1   7/2005
DE    10 2005 052 201 A1   5/2007
(Continued)

*Primary Examiner* — D Glenn Dayoan
*Assistant Examiner* — Melissa A Black
(74) *Attorney, Agent, or Firm* — McGlew and Tuttle, P.C.

(57) ABSTRACT

A drive system (2) tilt adjusts a back rest (10) of a vehicle seat (1). The back rest (10) is held on a seat base (11) by a fitting (12). An output pinion (24), drivable by a drive motor (20), is provided on the seat back side and interacts with a tooth segment (18) arranged rotationally fixed on the base (11). A pivot movement of the back rest (10) can be carried out by the drive motor (20) while the fitting (12) is unlocked. The output pinion (24) can be uncoupled from the drive motor (20) by a coupling (22). A compensation spring (14) acting between the back rest (10) and the base (11) pretensions the back rest (10) in the direction of the non-use position. A vehicle seat (1) with the drive system and a method for operating a drive system (2) are also provided.

15 Claims, 6 Drawing Sheets

(51) Int. Cl.
*B60N 2/20* (2006.01)
*B60N 2/235* (2006.01)

(56) References Cited

FOREIGN PATENT DOCUMENTS

| | | |
|---|---|---|
| DE | 10 2007 061 902 B3 | 1/2009 |
| DE | 10 2010 032 507 A1 | 1/2012 |
| DE | 10 2012 012 847 B3 | 9/2013 |
| DE | 10 2012 008 533 B4 | 8/2014 |
| EP | 2 565 070 A2 | 3/2013 |
| FR | 2927608 A1 | 8/2009 |
| JP | 2006290334 A | 10/2006 |

DRIVE SYSTEM FOR A TILT ADJUSTMENT, VEHICLE SEAT, METHOD FOR OPERATING A DRIVE SYSTEM

CROSS REFERENCE TO RELATED APPLICATIONS

This application is a United States National Phase Application of International Application PCT/EP2015/076196, filed Nov. 10, 2015, and claims the benefit of priority under 35 U.S.C. § 119 of German Applications 10 2014 223 260.0, filed Nov. 14, 2014, and 10 2015 200 816.9, filed Jan. 20, 2015, the entire contents of which are incorporated herein by reference.

FIELD OF THE INVENTION

The invention relates to a drive system for a tilt adjustment of a backrest of a vehicle seat which is foldable between a use position suitable for conveying a vehicle passenger and a non-use position which is pivoted forward with respect to the use position, and a vehicle seat as well as a method for operating a drive system.

BACKGROUND OF THE INVENTION

In motor vehicle seats, generally the backrest is able to be adjusted as finely as possible within a predetermined angular range at different angular positions, this adjustment being denoted as the backrest tilt adjustment. In motor vehicles with only one door per vehicle side and with rear seats or in vehicles with a third seat row, entry into a rear seat is facilitated by the backrest of the front seat being able to be folded forward rapidly. Folding forward the backrest of a rear seat is also desired for providing an enlarged loading base which is as flat as possible.

One problem with such adjusting devices is that they often have to be fitted in locations which have a small amount of installation space. Frequently, operating levers are concealed, also due to the construction, and/or arranged so as to be accessible only with difficulty by the user. To this end, in conventional adjusting devices a manual tilt adjustment of the backrest is generally complex and awkward for the user.

A vehicle seat comprising a generic adjusting device is disclosed, for example, in DE 10 2005 052 201 A1. The vehicle seat has a seat frame and a backrest which is able to be pivoted and folded relative to the seat frame, wherein in its locked use position the tilt of the backrest is able to be adjusted by motor within a comfort range into a plurality of comfort positions and, after being unlocked, the backrest (4) is able to be folded by motor between the upright use position and a folded-forward cargo position with a substantially horizontal position of the backrest. Moreover, a motorized drive is provided in the backrest, wherein a first electromotive adjusting device which is fixed to the backrest is provided for the tilt adjustment of the backrest and a second electromotive adjusting device which is fixed to the backrest and which is different from the first adjusting device is provided for folding the backrest. A common backrest pivot axis is provided for the pivoting movement of the tilt adjustment and the folding movement for folding the backrest, wherein the drive axes of the first and second electromotive adjusting device are different and a transmission means is provided.

A seat device comprising a rotary transmission mechanism is disclosed in US 2011/0 095 584 A1, said rotary transmission mechanism providing the transmission of the rotation to each of a plurality of adjusting mechanisms. This rotary transmission mechanism encompasses a motor, a worm, and two worm wheels in each case meshing with the worm and arranged in the vicinity of one another. This rotary transmission mechanism contains four clutch members, the clutch elements thereof being correspondingly arranged between the adjusting devices and the worm wheels. Each clutch element is configured such that it is able to be switched between a transmission state and an interruption state.

A gear set for a vehicle seat adjusting device is disclosed in DE 10 2007 061 902 B3, wherein the gear set comprises a drive pinion which is able to be driven by a motor shaft of an electric motor and an output gearwheel. It is also provided that an intermediate gearwheel unit is provided with a first intermediate gearwheel which is in engagement with the output gearwheel, wherein the drive pinion is able to be adjusted in the axial direction of the motor shaft between a first position in which it is in engagement with the intermediate gearwheel unit and a second position in which it is directly in engagement with the output gearwheel, wherein in the first and second position the output gearwheel is driven by the motor shaft with different reduction gear ratios.

Further generic vehicle seats are disclosed, for example, in DE 103 56 614 A1 and DE 10 2012 008 533 B4.

SUMMARY OF THE INVENTION

An object of the invention is to improve a drive system for a vehicle seat described in the introduction and to provide a corresponding vehicle seat.

A further object of the invention is to provide a method for operating such a drive system.

In the drive system according to the invention for a tilt adjustment of a backrest of a vehicle seat which is foldable between a use position suitable for conveying a vehicle passenger and a non-use position which is pivoted forward with respect to the use position, in particular of a vehicle rear seat, the backrest is held on a subframe of the vehicle seat by at least one fitting. An output pinion which is able to be driven by a drive motor is provided on the backrest side, wherein the output pinion cooperates with a toothed segment arranged fixedly in terms of rotation on the subframe. Moreover, it is provided that the output pinion is able to be uncoupled from the drive motor by means of a clutch, wherein a pivoting movement of the backrest is able to be carried out by means of the drive motor while the backrest is released in the fitting.

Within the meaning of the invention, the use position of the backrest which is suitable for conveying a vehicle passenger generally describes in this case a plurality of possible design positions of the backrest with different tilt angles relative to a vertical direction. A use position, when viewed in the viewing direction of an occupant seated in the normal sitting position in the vehicle seat, is substantially at an angle inclined to the rear ranging from 0° to 30°, preferably ranging from 10° to 25°, relative to the vertical direction. A "use position furthest to the rear" is denoted hereinafter as a use position which is inclined the furthest to the rear, when viewed in the viewing direction of the occupant, and which is additionally at the greatest angle relative to the vertical direction. Accordingly, a "use position furthest to the front" is denoted as the position at the smallest angle relative to the vertical direction.

By uncoupling the output pinion from the drive motor it is advantageously possible to uncouple the drive system from a movement of the backrest, by interrupting the flux of force between the drive motor and the output pinion. Moreover, in backrests with the drive system according to the invention, this also permits the possibility of a manual tilt adjustment of the backrest, as is used in the known manner in previous backrests.

Since a pivoting movement of the backrest is able to be carried out by means of the drive motor, the advantage is achieved that a particularly compact drive system which is able to be installed in the backrests of vehicle seats is provided. Equally, it is also possible to retrofit the drive system in existing backrests, provided the fitting of the backrest is able to be locked and unlocked.

According to a first exemplary embodiment of the drive system, the tilt adjustment is able to be fixed by means of the fitting. To this end, the fitting is able to adopt a locked and an unlocked state. As a result, in addition to the actuation by means of the drive system, it is possible to provide a manual adjustment via an adjustment option provided in the fitting. Moreover, the fixed fitting may be designed in order to receive a greater load acting in the event of a crash, in order to increase thereby the safety of the vehicle occupants in an advantageous manner.

According to a further exemplary embodiment of the drive system, a compensation spring which is supported on the backrest and the subframe is provided, the backrest being pretensioned thereby in the direction of its pivoted-forward non-use position. Depending on the operating mode of the method according to the invention described hereinafter, the compensation spring, on the one hand, cooperates with the drive system in order to permit an opposing force thereto for the more targeted fine adjustment of the tilt of the backrest and, on the other hand, cooperates with the fitting in order to hold the fixing thereof always in engagement when the backrest is fixed in the fitting.

According to a further exemplary embodiment of the drive system, a gear unit is arranged between the drive motor and the output pinion. As a result, it is advantageously possible to reduce the motor speed to a desired initial rotational speed of the output pinion and/or to set a desired torque to be transmitted.

According to a further exemplary embodiment of the drive system, the drive system comprises an actuator, the clutch being able to be actuated thereby. In this case, the clutch may be advantageously controlled by simple means by using an actuator.

According to a further exemplary embodiment of the drive system, the drive system comprises an unlocking device, the fitting of the backrest being able to be actuated, in particular being able to be locked and/or unlocked, thereby. It is advantageous here that the unlocking device is able to be controlled both by the drive system and by designated manual actuation.

According to a further exemplary embodiment of the drive system, the actuator and/or the unlocking device are able to be electrically actuated. By means of the actuator which is able to be actuated electrically, it is possible to actuate the clutch by a desired pre-adjustable force and/or at a desired time. Similarly, in the course of the method according to the invention described hereinafter, the unlocking device which is able to be actuated electrically permits a targeted actuation, in particular at a desired time, of the unlocking and/or locking.

According to a further exemplary embodiment of the drive system, the vehicle seat is able to be locked by a lock to the vehicle floor. In this case, it is advantageous if greater forces are able to be absorbed and/or borne by means of the lock in the event of a crash.

According to a further exemplary embodiment of the drive system, the lock is able to be unlocked by an unlocking device which is able to be actuated electrically. An unlocking device which is able to be actuated electrically permits a targeted actuation, in particular at a desired time, of the unlocking and/or locking in the course of the method according to the invention described hereinafter.

According to a further exemplary embodiment of the drive system, a control device which controls the drive motor and/or an actuator and/or an unlocking device is provided.

A corresponding control by means of the control device within the meaning of the invention generally describes an electrical activation and/or deactivation of the respectively controlled components but also a controlled influence of the operation of these components. For example, the control may be designed for setting a desired rotational speed of the drive motor and for controlling and/or for regulating this drive motor by means of a pulse-width modulated control signal.

For further regulation and, in particular, for adapting the timing of the control of the different components to one another, it may also be advantageous if the control device is connected to one or more sensors in order to detect information about the actual state of the respective components.

A vehicle seat according to the invention, in particular a vehicle rear seat, comprising a backrest which is foldable between a use position suitable for conveying a vehicle passenger and a non-use position which is pivoted forward with respect to the use position, in particular, comprises a drive system according to the above description. Accordingly, the vehicle seat according to the invention has the same advantages as the aforementioned drive system.

A method according to the invention for operating a drive system for a tilt adjustment of a backrest of a vehicle seat which is foldable between a use position suitable for conveying a vehicle passenger and a non-use position which is pivoted forward with respect to the use position, according to the above description, is characterized by:
  a first operating mode in which the drive motor is uncoupled from the backrest and the backrest is moved into the non-use position, driven by a compensation spring;
  a second operating mode in which the drive motor coupled to the backrest moves the backrest into the use position, counter to a tensioning force produced by the compensation spring;
  a third operating mode in which the drive motor coupled to the backrest moves the backrest in the direction of the non-use position by controlled release of the tensioning force produced by the compensation spring.

The first operating mode principally serves to move the backrest in the direction of its pivoted-forward non-use position. Driven by the compensation spring, the backrest is moved as rapidly as possible into a non-use position which, in particular, serves for providing a loading base which is as flat as possible, preferably for extending a loading base provided in a luggage space of a motor vehicle. The moving of the backrest into this position preferably takes place within a few seconds, preferably less than 10 seconds, particularly preferably less than 6 seconds.

The second operating mode serves to move the backrest in the direction of the use position furthest to the rear, for example from the non-use position, in order to provide either a seat surface of the vehicle seat once again or to set the tilt of the backrest in the direction of the use position furthest to the rear. The movement of the backrest by means of the drive motor preferably takes place at an adjustable speed so that, proceeding from the non-use position of the backrest, resetting the backrest upright for providing a seat surface of the vehicle seat which is suitable for conveying a vehicle passenger, for example, may take place at greater speed so that such a procedure, in particular, may be completed within 15 seconds. Equally, a comfort adjustment of the tilt of the backrest in the direction of the use position furthest to the rear may accordingly take place at a correspondingly slower speed, so that such a procedure, in particular, may take place at an average angular speed ranging from 3 to 4 degrees per second, whereby for traveling over the maximum possible range between the non-use position and the use position up to 35 seconds may be required.

The third operating mode also serves to move the backrest in the direction of a use position furthest to the front and/or its non-use position but at a controlled slower speed, in particular at an average angular speed ranging from 3 to 4 degrees per second.

Before the embodiments of the invention are described hereinafter in more detail with reference to the drawings, it should be firstly stated that the invention is not limited to the described components or the described method steps. Moreover, the terminology used also does not represent any limitation but is only of an exemplary nature. Insofar that the singular is used hereinafter in the description and the claims, in each case the plural is encompassed thereby, provided the context does not explicitly exclude this.

The invention is described in more detail hereinafter with reference to the advantageous exemplary embodiments shown in the figures. However, the invention is not limited to these exemplary embodiments.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:
FIG. 1b is an enlarged view of a detail of the vehicle seat of FIG. 1a.

DESCRIPTION OF THE PREFERRED EMBODIMENTS

Figure 1A:
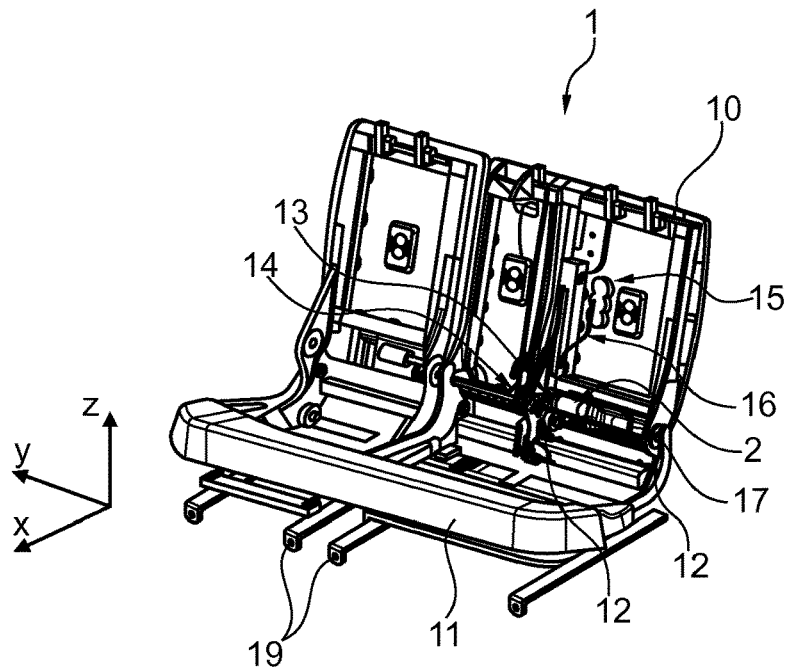
FIG. 1a is a view of a vehicle seat according to the invention.

Referring to the drawings, the vehicle seat shown schematically in FIG. 1a is described hereinafter by using three spatial directions extending perpendicular to one another. A longitudinal direction x in a vehicle seat installed in the vehicle extends substantially horizontally and preferably parallel to a vehicle longitudinal direction which corresponds to the usual direction of travel of the vehicle. A transverse direction y extending perpendicular to the longitudinal direction x is also aligned horizontally in the vehicle and extends parallel to a vehicle transverse direction. A vertical direction z extends perpendicular to the longitudinal direction x and perpendicular to the transverse direction y. In a vehicle seat installed in the vehicle the vertical direction z extends parallel to the vehicle vertical axis.

The positional information and directional information used, such as for example front, rear, top and bottom refer to a viewing direction of an occupant in the normal seating position sitting in the vehicle seat, wherein the vehicle seat is installed in the vehicle in a use position suitable for conveying a passenger with the seat backrest upright and oriented in the conventional manner in the direction of travel. However, the vehicle seat according to the invention may also be installed in a different orientation, for example transversely to the direction of travel.

Figure 1B:
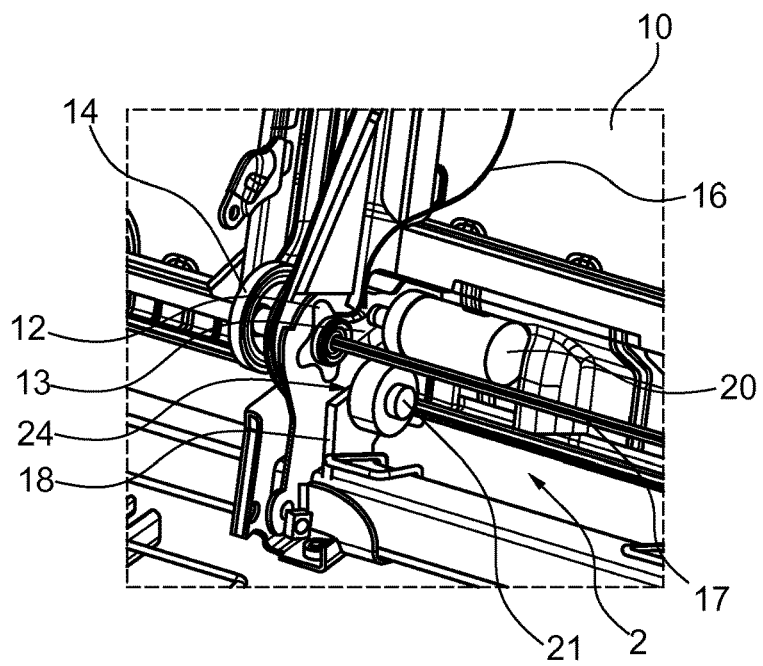

In FIG. 1a a view of a vehicle seat 1 according to the invention is shown, whereas FIG. 1b shows an enlarged view of a detail of the vehicle seat of FIG. 1a. Due to the high level of similarity between the two drawings, FIGS. 1a and 1b are described together hereinafter.

It may be derived from FIG. 1a that a vehicle seat 1, in particular a vehicle rear seat, has a backrest 10 which is foldable between a use position suitable for conveying a vehicle passenger and a non-use position which is pivoted forward with respect to the use position. The backrest 10 has a drive system 2. The vehicle seat 1 in this case is preferably locked to the vehicle floor by a lock, not shown for technical illustration reasons, wherein further preferably the lock is able to be unlocked by an unlocking device which is able to be actuated electrically. The vehicle seat 1 is also connected to the vehicle floor by means of a seat rail pair 19, which consists of an upper rail fixed to the seat and a lower rail which is fixed to the body, and which is displaceable in the longitudinal direction x.

Moreover, it may be derived from the view of FIG. 1b, viewed together with FIG. 1a, in detail that the drive system 2 is provided for a tilt adjustment of a backrest 10 which is foldable between a use position suitable for conveying a vehicle passenger and a non-use position which is pivoted forward with respect to the use position. The backrest 10 is held on both sides by a fitting 12 on a subframe 11 of the vehicle seat 1. At least one of the two fittings 12 is a continuously lockable fitting, as is disclosed in DE 10 2012 012 847 B3, whereas the corresponding other fitting 12 may also be designed as a rotary bearing without locking. Preferably, however, one respective continuously lockable fitting 12 is provided on both sides. Moreover, an output pinion 24 is provided on the backrest side, said output pinion being able to be driven by a drive motor 20, wherein the output pinion 24 cooperates with a toothed segment 18 arranged fixedly in terms of rotation on the subframe 11. The output pinion 24 is able to be uncoupled from the drive motor 20 by means of a clutch 22. The pivoting movement for the tilt adjustment of the backrest 10 is able to be carried out by means of the drive motor 20, while the backrest 10 is unlocked and/or released in the fitting 12.

Moreover, in FIGS. 1a and 1b it is shown that the tilt adjustment is able to be fixed in the fitting 12, wherein the drive system 2 has an unlocking device 15, the fitting 12 of the backrest 10 being able to be actuated, in particular being able to be locked and/or unlocked, thereby. The unlocking device 15 is preferably able to be actuated and/or controlled electrically.

A compensation spring 14 acting between the backrest 10 and the subframe 11, the backrest 10 being pretensioned thereby in the direction of a non-use position, may also be derived from the view of FIG. 1b.

The backrest 10 is connected relative to the subframe 11 on both sides to one respective fitting 12, preferably a continuously lockable fitting. In this case, such a lockable fitting 12 is provided on at least one side, whereas the fitting 12 on the opposing side may be designed as a simple rotary bearing. In the case of two lockable fittings 12, as shown, said fittings may be connected together via a transmission rod 17. An optionally provided unlocking device 15 for actuating a backrest locking is designed to act on an unlocking lever 13 via a Bowden cable 16, which in turn unlocks the respective lockable fitting 12 so that the backrest 10 is released, or in other words freely rotatable, relative to the subframe 11. After deactivating the unlocking device 15, the fitting 12 adopts its locked state again, driven by the spring.

The transmission rod 17 represents a connection between the two fittings 12 arranged on the right and left. Thus the two fittings 12 are connected and at the same time opened and/or closed when the unlocking device 15 is actuated. If, for example, due to the constructional space available in the backrest structure it is not possible or even not necessary to use a transmission rod 17, this may also be dispensed with. As an alternative to the transmission rod 17 it is preferred that the unlocking device 15 activates both fittings 12 via one respective Bowden cable 16. Equally it is possible to arrange the unlocking lever 13 on the transmission rod 17, the unlocking lever 13 in this case being connected thereby to the fitting(s) 12.

Via the Bowden cable 16 the unlocking device 15 acts on a corresponding unlocking lever 13 which is connected to a fitting 12 and converts the movement of the unlocking device 15 which is transmitted via the Bowden cable 16 to the unlocking lever 13 into a rotational movement, the fitting 12 being finally opened and/or unlocked thereby.

The drive motor 20 of the drive system 2 is preferably an electrically operated motor but preferably a motor which is able to be regulated in terms of its rotational speed and which is connected on the output side to a gear unit 21. These two components, the drive motor 20 and the gear unit 21, are connected fixedly in terms of rotation to the backrest 10 and/or are arranged on a structure of the backrest 10. An output pinion 24 which is able to be connected to the gear output cooperates with a toothed segment 18 on the subframe side which is connected fixedly in terms of rotation to the subframe 11. By the output pinion 24 being guided along the path of the toothed segment 18, the backrest 10 is able to be adjusted relative to the subframe 11 when the drive motor 20 drives the output pinion 24 via the gear unit 21. The output pinion 24 is permanently in engagement with the toothed segment 18.

A compensation spring 14 may be designed, in particular, to operate in an identical manner to the designs already known. The compensation spring ensures that the backrest 10 is moved into the desired position for providing a flat loading base shortly after actuating the corresponding function, i.e. in the shortest possible time. Moreover, the compensation spring 14 ensures that the lockable fitting 12 is securely locked again after an adjusting procedure has been completed.

Figure 2:
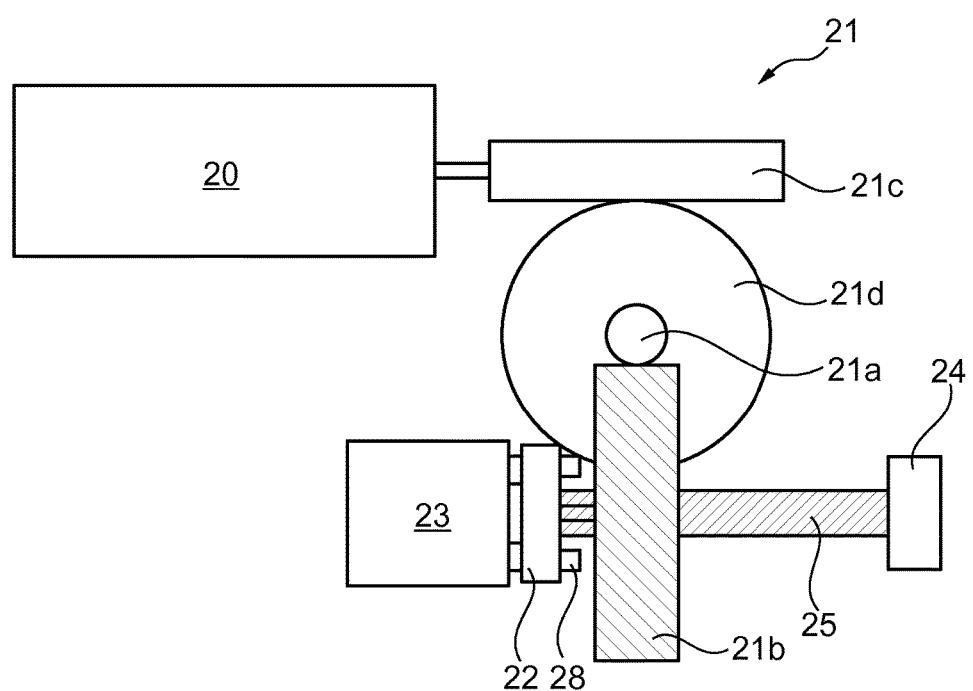
FIG. 2 is a schematic view of a possible embodiment of the drive system according to the invention.
Figure 3A:
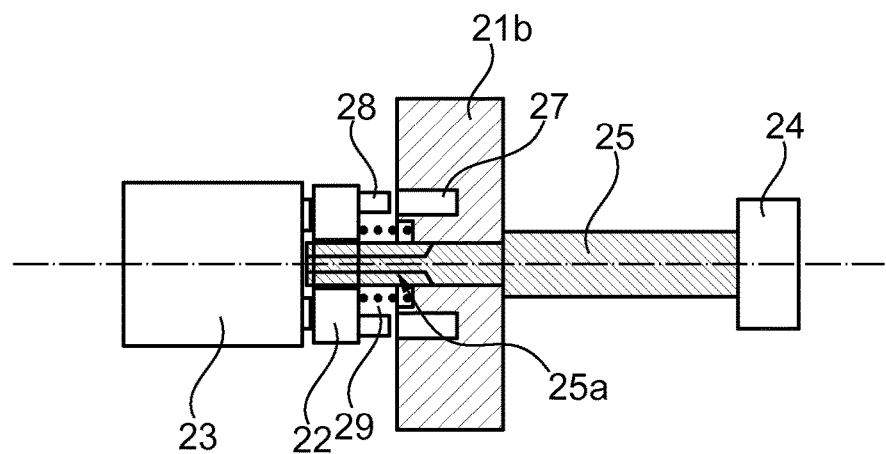
FIG. 3a is a detailed view of the drive system of FIG. 2 in the decoupled state.
Figure 3B:
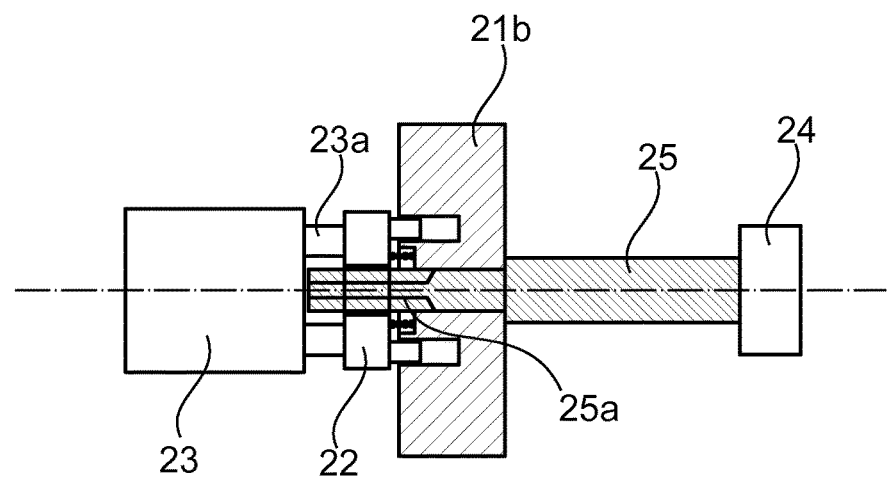
FIG. 3b is a detailed view of the drive system of FIG. 2 in the coupled state.

A schematic view of one possible embodiment of the drive system 2 according to the invention may be derived from the view of FIG. 2 and also of FIGS. 3a and 3b. In detail, FIGS. 3a and 3b show the gear unit 21 arranged between the drive motor 20 and the output pinion 24, once in an open state of the clutch 22 (FIG. 3a) and once in a closed state of the clutch 22 (FIG. 3b).

An embodiment of the drive system 2, in particular of the drive motor 20 and of the gear unit 21, is shown in FIG. 2. The gear unit 21 does not necessarily consist, however, of a multistage worm gear with a worm 21a and a gearwheel 21b which are in engagement with one another and which form a first gear stage and with a further worm 21c and a further gearwheel 21d which are in engagement with one another and which form a further gear stage. A single stage gear unit 21 comprising only one first gear stage is also conceivable. The force is produced by the drive motor 20 and transmitted via the drive shaft of the drive motor 20 to the worm 21c of the further gear stage of the gear unit 21. A speed reduction of the initial rotational speed takes place in the further gear stage. Via the worm wheel 21d of the further gear stage, the worm 21a of the first gear stage is driven, which in turn represents the drive of the worm wheel 21b of the first gear stage. In the first gear stage, for example, a further adaptation of the rotational speed to the initial rotational speed on the output pinion 24 may take place. The force transmission to the output pinion 24 takes place through the output shaft 25 when the clutch 22 is coupled. The worm wheel 21b is rotatably mounted on the output shaft 25. A contoured portion 25a of the output shaft 25 is arranged at the end of the output shaft 25 remote from the output pinion 24, a clutch 22 being arranged thereon. The clutch 22 in this case is preferably connected fixedly in terms of rotation to the output shaft 25 by means of an opening in the circumferential direction of the rotational axis 26 of the output shaft 25, said opening being configured in a complementary manner to the contoured portion 25a of the output shaft 25, and said clutch is able to be displaced along the contoured portion 25a of the output shaft 25 in the axial direction of the rotational axis 26 of the output shaft 25.

"Fixed in terms of rotation" within the meaning of the invention generally means that a load torque may be transmitted in both rotational directions via the contoured portion. This connection which is fixed in terms of rotation between the clutch 22 and the output shaft 25 is maintained in this embodiment over the entire axial displacement path along the contoured portion 25a. The contoured portion in this case, for example, may have a toothing or a tongue-groove connection which permits an axial displaceability and tangential force transmission. Moreover, the clutch 22 comprises one or more engagement means 28 which oppose corresponding recesses 27 in the worm wheel 21b and which are able to be brought into engagement with the recesses 27. If the engagement means 28 are in engagement with the recesses 27, a rotation of the worm wheel 21b is transmitted by means of the clutch 22 to the output shaft 25.

An actuator 23 is arranged on the front end of the toothed portion 25a of the output shaft 25, said actuator acting on the clutch 22 by means of designated pistons 23a in order to couple or decouple this clutch.

In the view of FIG. 3a, the gear unit 21 is shown in detail. In this case, the clutch 22 is shown in the decoupled and/or open state. This also corresponds to the state which is adopted when the drive system 2 is deactivated. In this state, the output pinion 24 which runs on the toothed segment 18 is not blocked by the drive motor 20 and the gear unit 21. The output pinion 24 is able to rotate freely with a movement of the backrest 10 and its movement along the toothed segment 18 may take place almost without resistance. This permits a manual setting of the tilt of the backrest 10 by the user.

In the view of FIG. 3b the gear unit 21 is shown in the coupled and/or closed state. The actuator 23 which is assigned to the gear unit 21 displaces the clutch 22 axially along the contoured portion 25a on the output shaft 25 in the direction of the worm wheel 21b until the engagement means 28 of the clutch 22 are in engagement with the recesses 27 of the worm wheel 21b. Thus the worm wheel 21b is connected fixedly in terms of rotation to the output shaft 25 and the drive motor 20 is able to adjust the backrest 10 according to the wishes of the user. After the drive system 2 has been deactivated again, the counterpressure spring 29 which is arranged between the worm wheel 21b and the clutch 22 forces the clutch 22 once again out of engagement with the worm wheel 21b and the drive system is again in the decoupled state according to the view of FIG. 3a.

The control of the drive motor has to take place via a control device so that the drive motor 20 only begins to rotate when the actuator 23 has coupled in the clutch 22. If the drive system 2 is in the initial position shown in FIG. 3a, wherein the clutch 22 is decoupled, after the fitting 12 is unlocked the backrest 10 falls into the non-use position in which the backrest 10 is intended to provide the function of a flat loading base. Thus a rapid folding-over is ensured. This is also implemented in the first operating mode of the proposed method for operating the drive system 2 and is described in more detail hereinafter with reference to FIG. 4.

For setting the backrest 10 upright, the clutch 22 is coupled in and the drive motor 20 is once again able to set the backrest 10 upright via the gear unit 21 and/or move the backrest in the direction of a use position furthest to the rear. Before the drive motor 20 adjusts the backrest 10, the clutch 22 is coupled in by means of the actuator 23. Setting the backrest 10 upright is preferably able to be implemented at different speeds, in particular at a more rapid speed for setting the backrest upright from the non-use position, for providing a basic function of the vehicle seat 1 suitable for conveying a vehicle passenger, and also at a slower speed which is able to be controlled by the user in an operating mode for comfort adjustment. This corresponds to the second operating mode of the proposed method for operating a drive system 2 which is described in more detail hereinafter with reference to FIG. 5.

After deactivating the drive system 2 the drive motor 20 firstly stops, the fitting 12 is locked and subsequently the clutch 22 is brought out of engagement. The state of the drive system 2 now corresponds to that of a mechanical backrest adjustment, so that a locking of the fitting 12 by means of the compensation spring 14 is guided by a slight movement of the backrest 10 into a full engagement of the locking and the fitting 12 is thus locked in a crash-safe manner.

Figure 4:
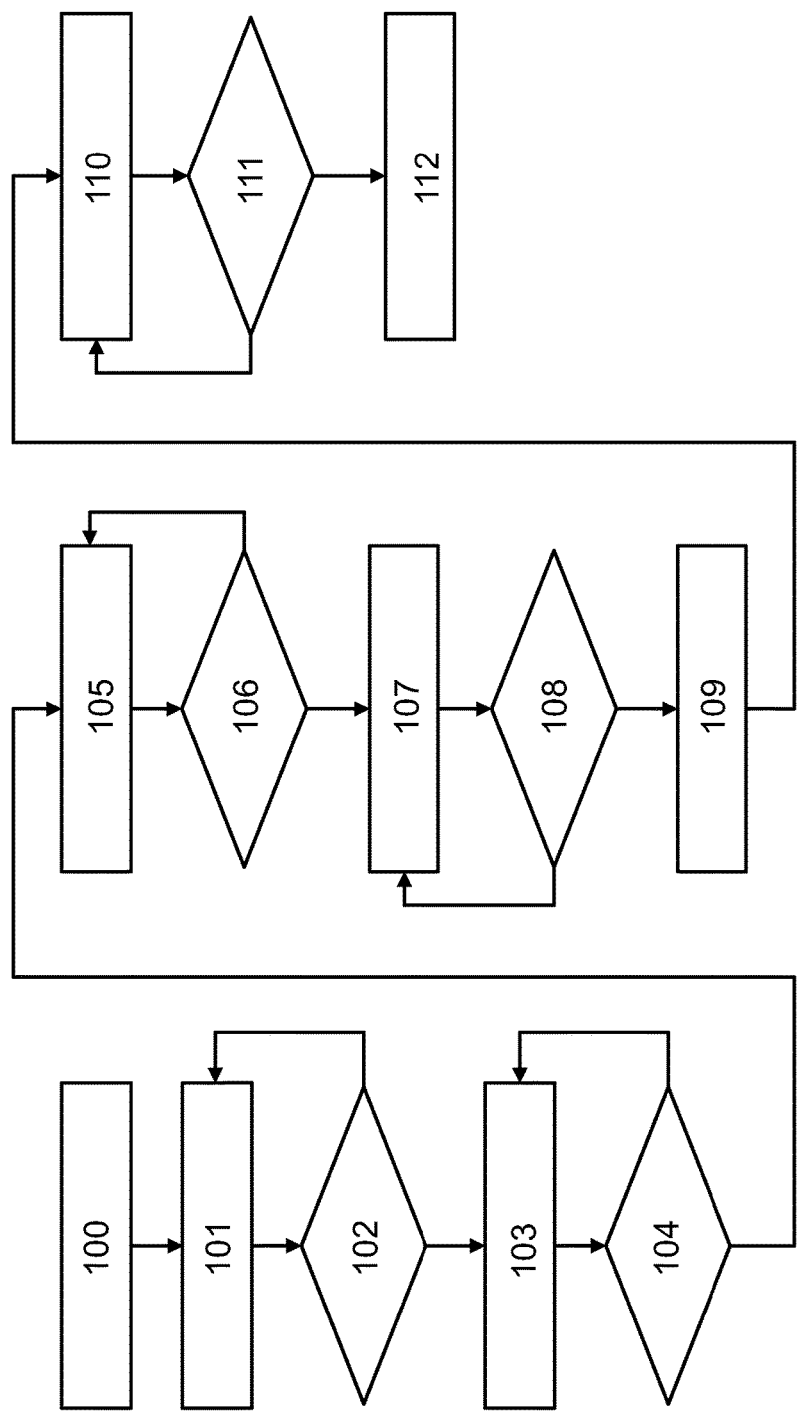
FIG. 4 is a flow diagram of the first operating mode of the method according to the invention.
Figure 5:
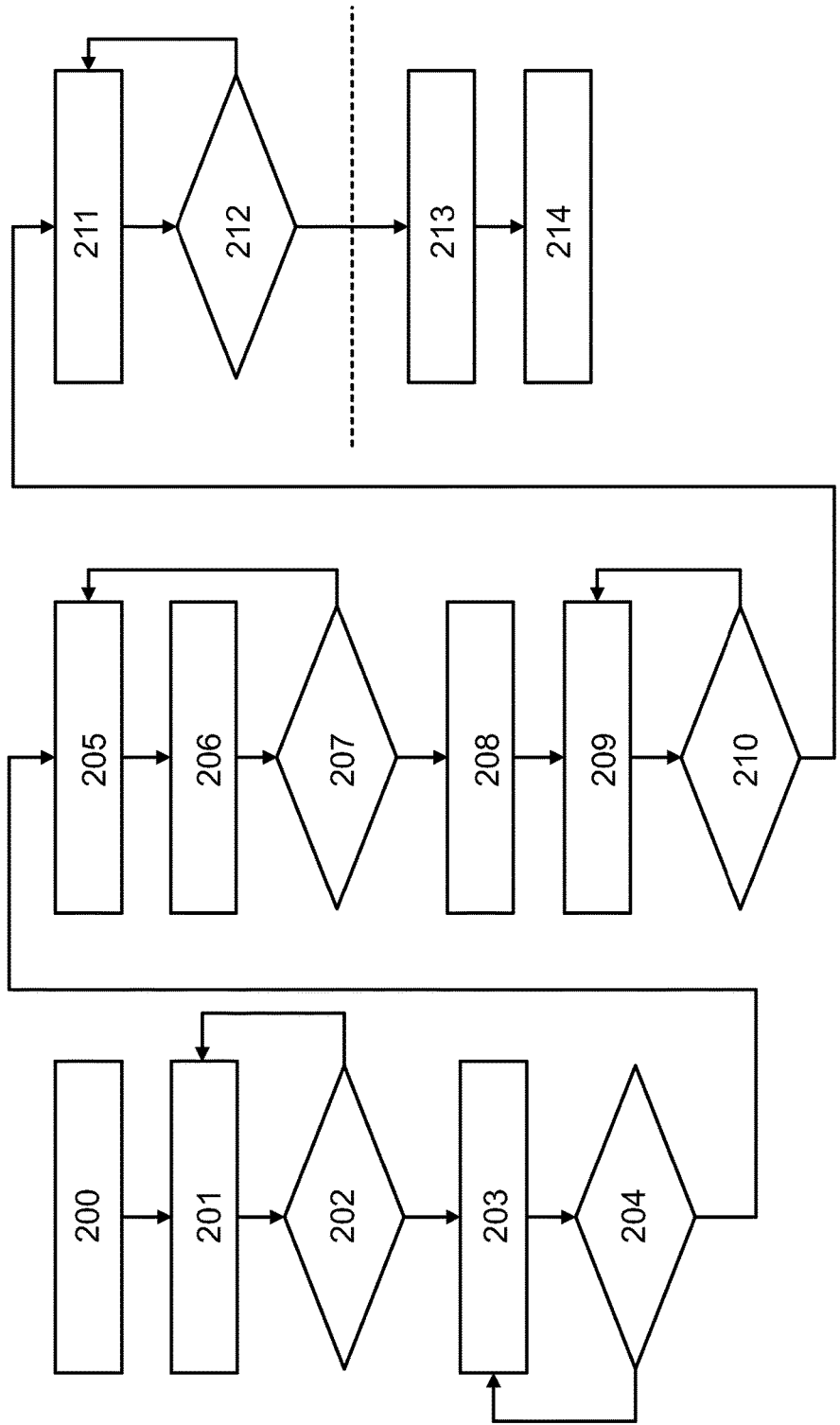
FIG. 5 is a flow diagram of the second operating mode of the method according to the invention.
Figure 6:
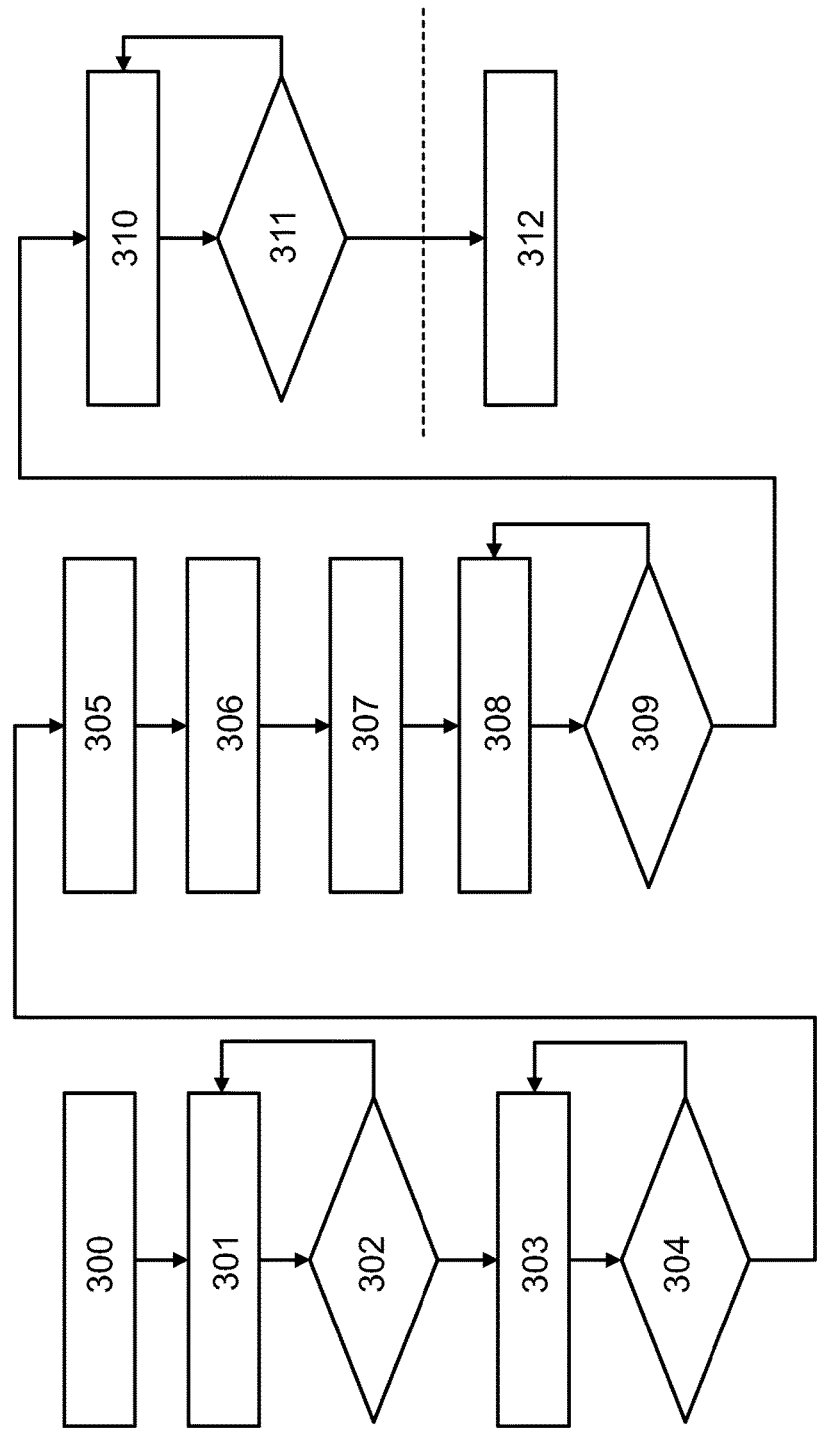
FIG. 6 is a flow diagram of the third operating mode of the method according to the invention.

The proposed method is shown in FIGS. 4, 5, 6 using flow diagrams, wherein each of the FIGS. 4, 5, 6 describes one of the three different operating modes of the method.

The flow diagram shown in FIG. 4 corresponds to the first operating mode of the method for operating a drive system 2. In this case it is provided that the drive motor 20 is uncoupled and the backrest 10 is moved into the non-use position, driven by a compensation spring 14.

Initially, an activation 100 of the first operating mode is required by the user. Subsequently in step 101 an activation of an automatic longitudinal adjustment of the vehicle seat 1 may take place in order to position the vehicle seat, for example, by means of a linear adjuster arranged in the seat rail pair 19 according to DE 10 2010 032 507 A1 in the longitudinal direction x such that an unhindered movement of the backrest 10 into the non-use position may take place. After verifying in step 102 whether a designated end position of the longitudinal adjustment of the vehicle seat 1 has been reached, an unlocking 103 of the vehicle seat 1 on the vehicle floor takes place. This is verified in the following step 104. According to step 105 an unlocking device 15 is actuated in order to unlock the fitting 12 of the vehicle seat 1. After verification 106 of the locking state of the fitting 12 in step 107 a movement of the backrest 10 takes place in the direction of the non-use position. For the verification 108, for example, it may be provided to detect the angular position of the backrest 10 by means of a sensor. If step 109 indicates that the maximum pivoted-forward non-use position of the backrest 10 is reached, in step 110 the unlocking device 15 is actuated in order to lock the fitting 12 and to fix the backrest 10 in the current position. After detecting 111 the secure locking of the fitting 12 step 112 transfers the drive system 2 into the end state of the first operating mode which corresponds to the initial state.

The flow diagram shown in FIG. 5 corresponds to the second operating mode of the method for operating a drive system 2. In this case, it is provided that the connected drive motor 20 moves the backrest 10, in particular, counter to a tensioning force produced by the compensation spring 14 in the direction of the use position furthest to the rear.

Initially an activation 200 of the second operating mode is required by the user. Subsequently, in step 201 the fitting 12 may be unlocked by actuating the unlocking device 15. After verification 202 of the previously actuated unlocking in step 203 an actuation of the clutch 22 takes place by the actuator 23, whereby the clutch 22 is coupled in. After a connection of the clutch 22 to the gearwheel 21d has been established in step 204, in step 205 the drive motor 20 is actuated in order to move the backrest 10 in the direction of the use position furthest to the rear. In this case in step 206 the vehicle seat 1 optionally is automatically locked to the vehicle floor. After verification in step 207 whether the use position has been reached, in step 208 the drive motor 20 is switched off. Subsequently, in step 209 the fitting 12 is locked, which is correspondingly detected and verified in step 210. If a locking of the fitting 12 has been able to be ascertained, in step 211 a decoupling of the clutch 22 is carried out by the actuator 23. Step 212 verifies whether the clutch 22 is opened. The line shown in dashed lines shows a transition into the standard state of the drive system 2. Accordingly, the tilt adjustment of the backrest 10 behaves as a known manual system for tilt adjustment. In step 213 a maximum engagement of the locking of the fitting 12 is achieved by the compensation spring 14. Subsequently, the drive system 2 is transferred to the end state 214 of the second operating mode, which also corresponds to the initial state.

The flow diagram shown in FIG. 6 corresponds to the third operating mode of the method for operating a drive system 2. In this case, it is provided that the connected drive motor 20 moves the backrest 10 in the direction of the non-use position, by controlled release of the tensioning force produced by the compensation spring 14.

Initially an activation 300 of the third operating mode is required by the user. Then, by an actuation 301 of the actuator 23 the clutch 22 is coupled in. The process step 302 verifies, for example by means of a sensor, whether the clutch 22 is closed and refers back to the actuation 301 for a sufficient length of time until the clutch 22 is closed. After coupling in the clutch 22 according to step 303, an unlocking device 15 is activated which unlocks the fitting 12. A verification 304 is carried out in order to ascertain whether the fitting 12 is unlocked. To this end, further sensors which are connected to the control unit may be provided.

In the process step 305 the drive motor 20 is actuated, provided the user, for example by holding down a switch, generates a corresponding control signal. When the desired tilt of the backrest 10 is reached, the user in 306 deactivates the drive system 2 and in the following step 307 the drive motor 2 is stopped. In step 308, the unlocking device 15 is actuated in order to lock the fitting 12. The locking state of the fitting 12 is detected in step 309 by means of a sensor and after the fitting 12 has been locked, an actuation 310 of the actuator 23 for uncoupling the clutch 22 is triggered. Step 311 verifies whether the clutch 22 has been opened and is then transferred into the end state 312 of the third operating mode.

Each time an operating mode is passed through, the drive system 2 is again in the initial state and is once again ready for passing through any operating mode or a manual setting of the tilt of the backrest 10 by the user.

The features disclosed in the above description, the claims and the drawings may be significant both individually and in combination for implementing the invention in its various embodiments.

Whilst the invention has been described in detail in the drawings and the above description, the drawings are illustrative and given by way of example and are not to be understood as limiting. In particular, the choice of proportions of the individual elements, shown in the drawings, are not be interpreted as mandatory or limiting. Moreover, in particular, the invention is not limited to the disclosed exemplary embodiments. Further variants of the invention and its implementation are revealed for the person skilled in the art from the above disclosure, the Figures and the protected claims.

While specific embodiments of the invention have been shown and described in detail to illustrate the application of the principles of the invention, it will be understood that the invention may be embodied otherwise without departing from such principles.

The invention claimed is:

1. A drive system for a tilt adjustment of a backrest of a vehicle seat which is foldable between a use position, suitable for conveying a vehicle passenger, and a non-use position, which is pivoted forward with respect to the use position, wherein the backrest is held on a subframe of the vehicle seat by at least one fitting, the drive system comprising:
    a drive motor;
    an output pinion to be driven by the drive motor, the pinion being provided on a backrest side;
    a toothed segment, the output pinion cooperating with the toothed segment and the toothed segment being arranged fixedly in terms of rotation on the subframe;
    a clutch; and
    a compensation spring, wherein a pivoting movement of the backrest is carried out by means of the drive motor while the fitting is unlocked, the output pinion is able to be uncoupled from the drive motor by means of the clutch and the compensation spring acts between the backrest and the subframe to pretension the backrest in a direction of the non-use position.

2. The drive system as claimed in claim 1, wherein the tilt adjustment is able to be fixed by means of the fitting.

3. The drive system as claimed in claim 1, further comprising a gear unit arranged between the drive motor and the output pinion.

4. The drive system as claimed in claim 1, further comprising an actuator, the clutch being able to be actuated thereby.

5. The drive system as claimed in claim 1, wherein the clutch comprises one or more engagement elements, which are arranged opposite corresponding recesses in a worm wheel and which are able to be brought into engagement with the recesses.

6. The drive system as claimed in claim 1, wherein an output shaft is coupled with the output pinion and a contoured portion of the output shaft is provided at the end of the output shaft remote from the output pinion, the clutch being arranged on the contoured portion.

7. The drive system as claimed in claim 6, wherein the clutch is connected fixedly, in terms of rotation, to the output shaft by means of an opening in the circumferential direction of the rotational axis of the output shaft, said opening being configured in a complementary manner to the contoured portion of the output shaft, and said clutch is able to be displaced along the contoured portion of the output shaft in the axial direction of the rotational axis of the output shaft.

8. The drive system as claimed in claim 1, wherein the drive system comprises an unlocking device, the fitting of the backrest being able to be actuated thereby.

9. The drive system as claimed in claim 8, wherein the fitting of the backrest is able to be locked or unlocked or both locked and unlocked.

10. The drive system as claimed in claim 1, wherein the unlocking device is able to be electrically actuated or controlled or both electrically actuated and controlled.

11. The drive system as claimed in claim 1, wherein the vehicle seat is able to be locked by a lock to the vehicle floor.

12. The drive system as claimed in claim 1, further comprising a control device which controls the drive motor or an actuator or an unlocking device controls and combination of the drive motor and an actuator and an unlocking device.

13. A vehicle seat comprising a backrest which is foldable between a use position suitable for conveying a vehicle passenger and a non-use position which is pivoted forward with respect to the use position, the vehicle seat further comprising a drive system comprising:
    a drive motor;
    an output pinion to be driven by the drive motor, the pinion being provided on a backrest side;
    a toothed segment, the output pinion cooperating with the toothed segment and the toothed segment being arranged fixedly in terms of rotation on the subframe;
    a clutch; and
    a compensation spring, wherein a pivoting movement of the backrest is carried out by means of the drive motor while the fitting is unlocked, the output pinion is able to be uncoupled from the drive motor by means of the clutch and the compensation spring acts between the backrest and the subframe to pretension the backrest in a direction of the non-use position.

14. A method for operating a drive system for a tilt adjustment of a backrest of a vehicle seat which is foldable between a use position suitable for conveying a vehicle passenger and a non-use position which is pivoted forward with respect to the use position, the method comprising the steps of:

providing a first operating mode in which the drive motor is uncoupled from the backrest and the backrest is moved into the non-use position, driven by a compensation spring;

providing a second operating mode in which the drive motor coupled to the backrest moves the backrest into a use position, counter to a tensioning force produced by the compensation spring;

providing a third operating mode in which the drive motor coupled to the backrest moves the backrest in the direction of the non-use position by controlled release of the tensioning force produced by the compensation spring.

15. The method as claimed in claim 14, wherein the backrest is able to be set upright at different speeds.

* * * * *